Figure 2B:
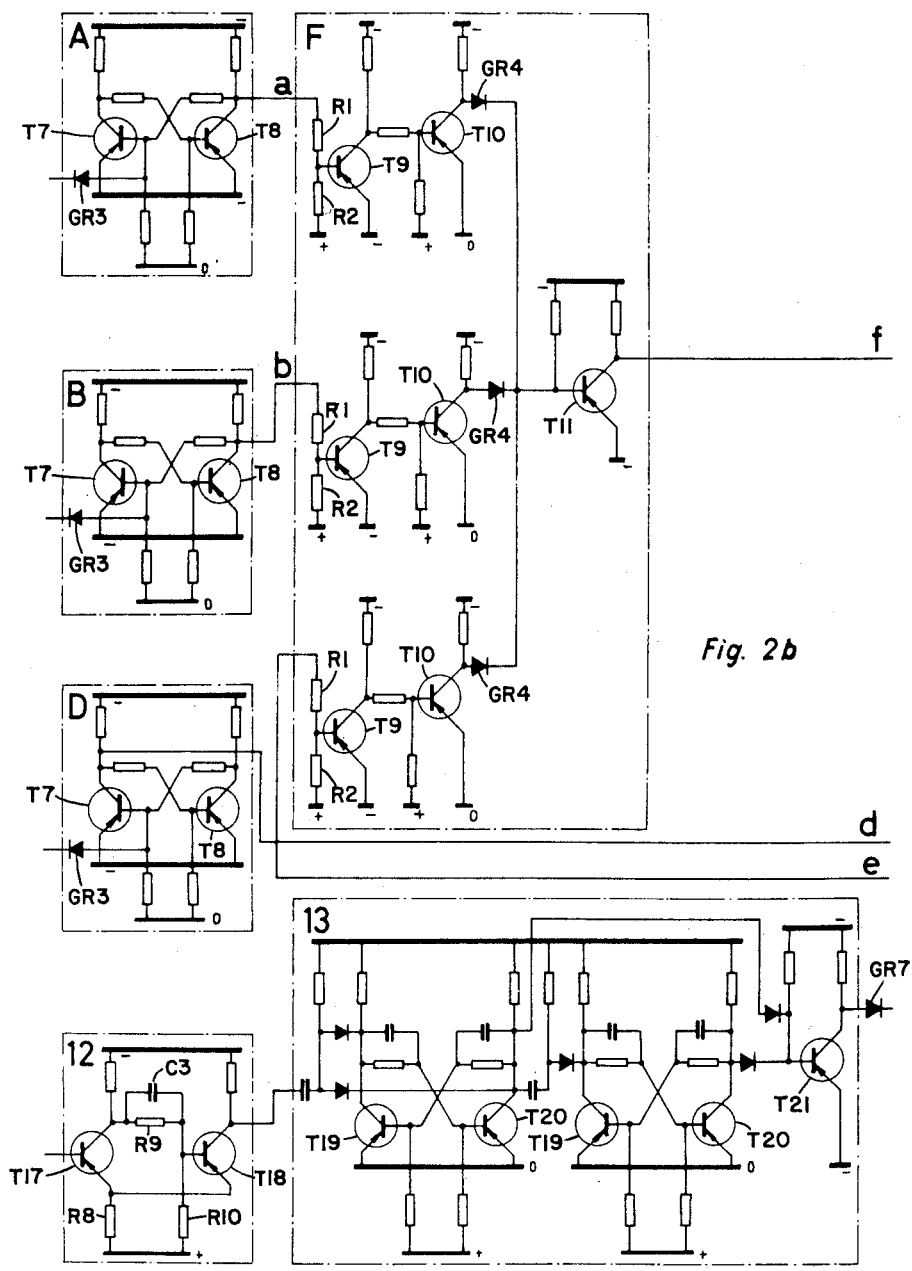

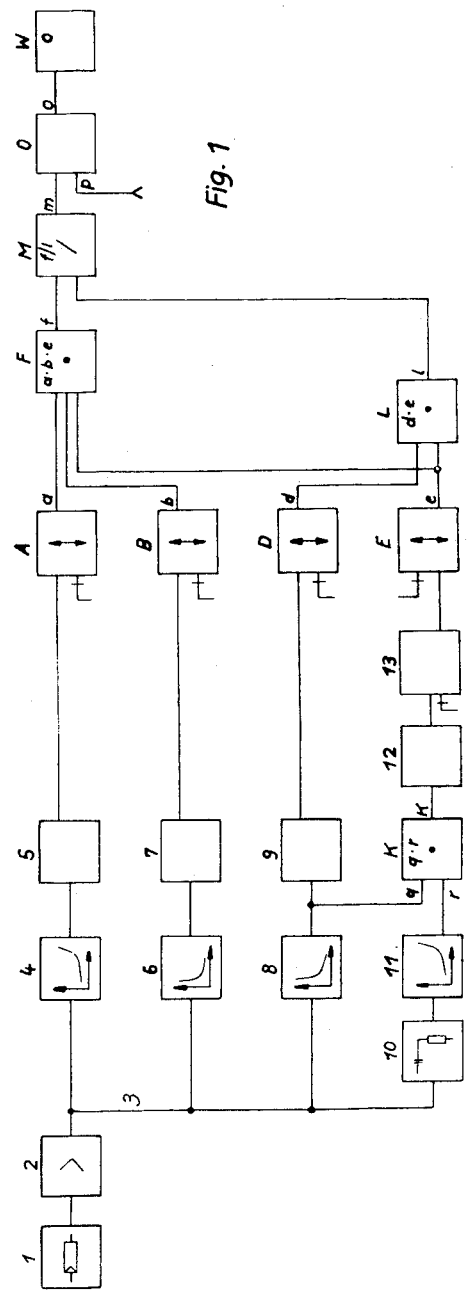

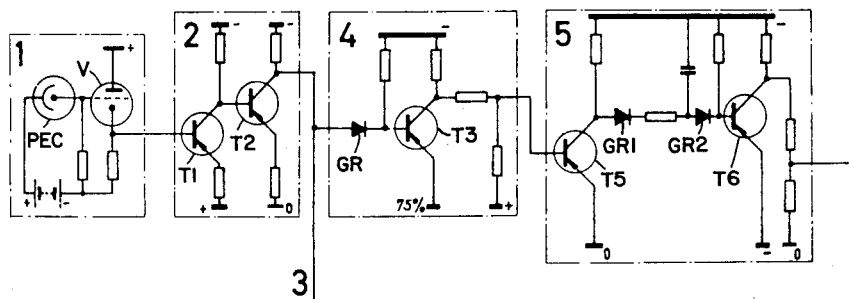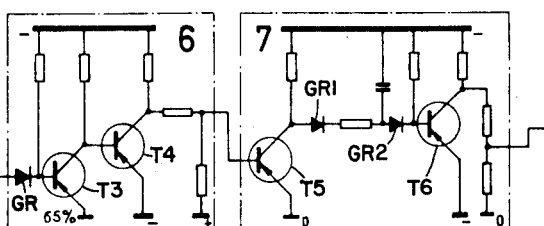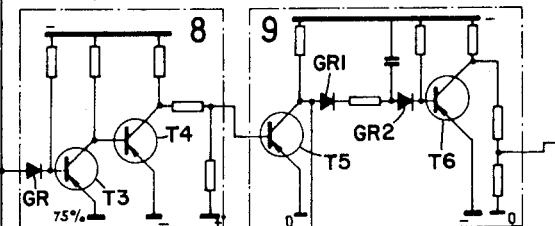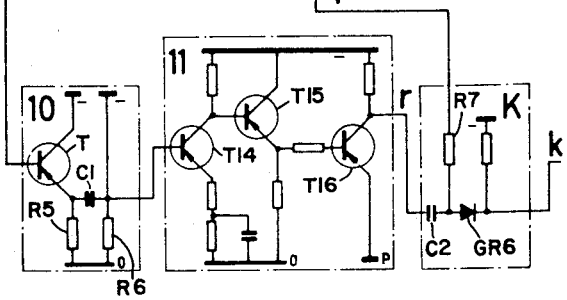
Fig. 2a

United States Patent Office 2,966,594
Patented Dec. 27, 1960

2,966,594

ARRANGEMENT FOR DETECTING CHARACTERISTIC MARKINGS ON ARTICLES

Werner Hinz, Berlin-Neukolln, and Horst Ruckert, Berlin-Wittenau, Germany, assignors to International Standard Electric Corporation, New York, N.Y., a corporation of Delaware Filed Jan. 29, 1959, Ser. No. 789,992

Claims priority, application Germany Feb. 10, 1958

8 Claims. (Cl. 250—219)

The invention concerns an arrangement that serves to ascertain marks affixed on legendized or inscribed papers. Such arrangements are used for sorting the papers so that they can be conveyed to a further place of treatment. For example, in the case of postal letters the location of the postage stamp on the envelope is ascertained in order to derive therefrom the position in which each letter will arrive at a certain point. This is desired so that the letter may be turned or reversed into the proper position for reading at such point. Such arrangements are also suitable for other uses, for instance, for separating papers provided with marks from those not provided therewith.

A well known means of solving this problem is to scan the papers by means of photoelectric devices. These devices comprise a source of light by which the respective paper is illuminated, and a photocell that receives the light reflected by the paper. The signals derived from the photocell are fed to associated amplifiers and filters.

The arrangement to which the invention relates is particularly intended to ascertain the location of postage stamps on mail articles. Therefore, the papers or mail articles are moved continuously past a photoelectric scanning device. This arrangement is required to ascertain the location at which the mark, such as the postage stamp, is affixed on the paper. This must be accomplished regardless of the background color of the paper or envelope. Therefore, it must be possible to test bright envelopes, as well as dark ones, by a similar operation. Moreover, the arrangement must also indicate possible cases wherein the respective paper either has no stamp at all or has markings thereon whose influence on the photoelectric scanning device is similar to that of a postage stamp. The marks should be of different degrees of brightness in the direction of motion of the papers, so as to affect the scanning device by a predetermined number of brightness fluctuations. This precaution is to prevent the scanning device from being affected by signs other than postage stamps. These signs may be of the same size as postage stamps and may have a brightness different than the background of the letter or other such mail article but will not have the optical characteristic of a postage stamp. Optically, each postage stamp is an aggregation of discriminative brightnesses and will thus produce a predetermined minimum number of fluctuations of a predetermined degree.

The main features of the invention are as follow: The signal produced by the scanning device is fed to a plurality of filters. The first filter passes a signal due to a high background brightness and having a predetermined duration. The second filter passes a signal due to a smaller background brightness and having a shorter duration while a third filter likewise passes a signal which is generated by a smaller background brightness but having a short duration as compared with the other signals. The signal is also fed parallel to the filters to a pulse counter whose output is fed to two gate circuits. The first of these gate circuits is controlled by the output of the first and second filters in conjunction with the output of the pulse counter while the second gate circuit is controlled by the third filter and the pulse counter. An evaluation equipment that may be used as either an indicating or a control unit precedes these gates. The signal produced by the scanning device will be passed to this evaluation equipment only if all the necessary conditions are fulfilled by the first two filters or the third filter and the pulse counter.

While we have described above the principles of our invention in connection with specific apparatus, it is to be clearly understood that this description is made only by way of example and not as a limitation to the scope of our invention, as set forth in the objects thereof and in the accompanying claims.

Fig. 1 shows the invention in block diagram form.

Figure 2C:
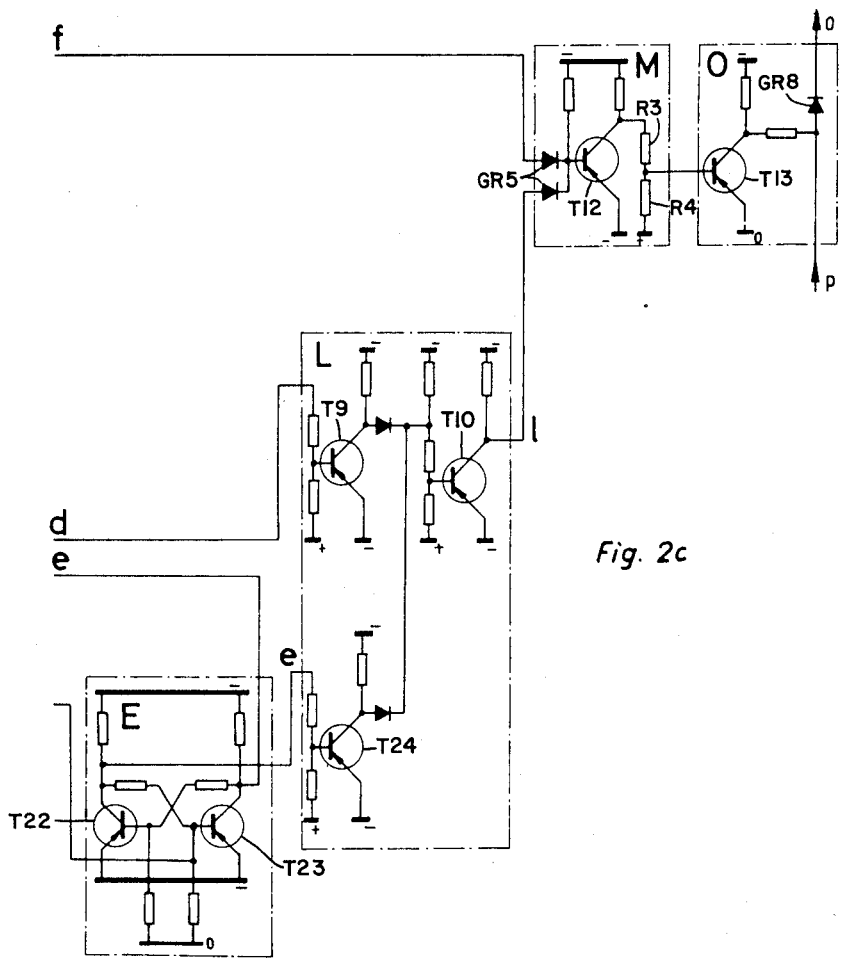

Figs. 2a, 2b, 2c when placed beside each other represent the systematic circuit diagram of the blocks in Fig. 1.

In the drawing, elements which are identical are given the same reference numerals.

Referring now to Fig. 1, the scanning device generates signals as the papers move continuously past it. Each signal is amplified by an amplifier 2 and then fed over a conductor 3 to three filters 4, 6 and 8 and a differentiation link 10 all connected in parallel. The output of filters 4, 6 and 8 are connected to integration links 5, 7 and 9 respectively. An amplitude-measuring device 11 is connected to the output of differentiation link 10. The output of device 11 is connected to the input by a lead $r$ of gate K. Elements 8 and 9 are joined together by a lead $q$ which is also connected to an input of gate K. The output of gate K is connected to a pulse converter 12 which converts the incoming signals into uniform pulses. These uniform pulses are applied to pulse counter 13 which can also be reset by a separate device. The outputs of the integration links 5, 7, and 9 and the pulse counter 13 are connected to resettable registers A, B, D and E respectively. The outputs of registers A, B, and E are connected to a gate F by conductors $a$, $b$, $e$. The outputs of registers D and E, are connected by leads $d$ and $e$ respectively, to inputs of gate L. The output of gates F, and L, which normally are alternately opened, are connected by leads $f$, to the inputs of a gate M. The output of gate M is connected by a line $m$ to the input of a gate O and the output of gate O is connected by a lead $o$ to the input of evaluation equipment W.

The quantity of light reflected by the paper towards the photocell is called a remission value. With a bright background the remission value is more than 75%, with a dark background it is less than 75%. The mean brightness of postage stamps is usually below a 65% remission value. A further criterion is the duration of the light acting on the photocell. The filters are, therefore, adjusted for the following values:

Filter 4 for a remission value greater than 75%,
Filter 6 for a remission value less than 65%,
Filter 8 for a remission value less than 75%.

The integration links 5, 7 and 9 measure the values existing during predetermined periods. The output of filter 4 is measured by link 5 for a duration that corresponds to a 20 millimeter travel of the paper past the photocell. The corresponding distance in the case of link 7, connected to filter 6, is 10 millimeters, while in the case of link 9, connected to filter 8, it amounts to 40 millimeters.

The differentiation link 10 serves to separate the modulation from the direct current component thereof. The amplitude filter 11 transfers only those signals which are above a predetermined value to the gate K.

In Figs. 2a, 2b, and 2c, transistors are employed as basic circuit elements. The various potentials to which the electrodes of the transistors are connected are indicated by heavy lines to which +, — or 0 signs are attached.

The scanning performed by device 1 is initiated by a beam of light from a source (not shown). The light beam is reflected from a passing article onto a photocell PEC. The output of the photocell is connected to an electron tube V which is connected as a cathode-follower amplifier. The amplifier 2 comprises two transistor stages T1, and T2 connected in cascade. The filters 4, 6 and 8 are substantially all of the same construction, but the biases for the threshold values are different. In each case the input comprises a rectifier GR connected to an adequately biased transistor stage T3. The filters 6 and 8 also contain second transistors T4 which are connected to transistors T3 and which operate as phase inverters. The integration links 5, 7 and 9 are likewise similar to one another. They consist of transistors T5 whose collector electrodes are coupled to rectifiers GR1. Second transistors T6 have their base electrodes coupled to the rectifier GR1, via additional series rectifier GR2. Transistors 6 are output transistors.

The registers A, B and D consist of known types of flip-flop circuits that contain transistors T7 and T8. The inputs to these registers each contain a rectifier GR3. Gate F includes three input transistors T9, whose base electrodes are connected by leads $a$, $b$ and $e$ with the outputs of transistors T8 in registers A, B and E, respectively. Each of these leads is connected to the end of a voltage divider network consisting of series connected resistors R1 and R2 the junctions of which are connected to transistors T9. These stages are coupled to transistors T10, wherein the potential on the conductors $a$, $b$ and $e$, is amplified. The outputs of the transistors T10 are connected via rectifiers GR4 to a transistor T11 which, in conjunction with the diodes GR4, acts as a gate. The output of gate F is connected by lead $f$ to the input of gate M. Gate M also has an input connected to a gate L by a lead L. The leads $f$ and L each contain a rectifier GR5 which are connected to a common transistor T12. A voltage divider network, consisting of resistances R3, and R4 in series, is connected to the collector electrode of transistor T12. Gate O consists of transistor T13 which has its base electrode connected to the junction between resistances R3 and R4. A diode GR8 is connected to the collector electrode of transistor T13 and is in series with the leads $p$ and $o$. Transistor T13 supplies the scanning pulse to the evaluation equipment W, Fig. 1. Equipment W may comprise amplifiers (not shown) and a measuring and counting unit or a suitable control device, all of which are not shown since they are well known to those skilled in the art.

The differentiation link 10, contains resistances R5, R6 and a condenser C1, connected to the emitter electrode of its transistor T. In the amplitude filter 11, there is a first transistor T14 which acts as an amplifier, a second transistor T15 which acts as a separating stage, and a third transistor T16 which is the actual amplitude filter. Gate K consists of a rectifier GR6 which is common to the leads $q$, and $r$. Lead $q$ is connected at one end to the junction of rectifier GR1 and the collector electrode of transistor T5 of the integration link 9, and at the other end to the junction of rectifier GR6 and condenser C2 via resistance R7. Lead $r$ is connected to the output of amplitude filter 11 and to the other terminal of condenser C2. These two leads introduce, into gate K, a bias furnished by link 9. The output of the rectifier GR6 is connected by lead $k$ to the input of pulse converter 12. Pulse converter 12 consists of a pair of transistors T17 and T18 having their emitter electrodes connected together and connected to a positive voltage through load resistance R8. The base electrode of transistor T17 is connected to lead $k$. The base electrode of transistor T18 is connected to the collector electrode of transistor T17 via the RC network consisting of resistor R9 and condenser C3 connected in parallel. The base electrode of transistor T18 is also connected to a positive supply voltage via resistor R10. The pulse counter 13 comprises two flip-flop circuits consisting of transistors T19 and T20 respectively. These circuits are so connected that a certain number of input pulses produce an output pulse. This output pulse is connected to the output transistor T21 through rectifier GR7. The output of counter 13 is connected to the input of register E. This register comprises a single flip-flop stage consisting of transistors T22 and T23.

The outputs of registers E and D are connected to gate L. This gate consists of a pair of transistors T9 and T10 and is similar to gate F, except for an additional transistor T24. This gate furnishes an output signal which is fed to gate M if the registers D, and E have a signal stored therein.

Gate M conducts whenever it receives signals from either any one or both of the gates F and L.

Gate O has a second control input which is energized by a device (not shown) over lead $p$. This device furnishes a scanning pulse when the paper to be tested is passing by a certain point in its path of travel. If this pulse arrives at gate O together with or after the signal from gate M it will be passed through gate O to the evaluation equipment W. In accordance with what has already been stated, equipment W may be either an indication device adapted to discern the papers passing through the plant and to count them, or it may be a control device of known type for determining the further route of the respective papers.

The above described arrangement operates as follows: Assume the envelope of a letter arriving at scanning device 1 has a bright background. The signal produced by the scanning device 1, and amplified by amplifier 2, will consequently be passed by filter 4, whereas filter 8 remains blocked. As soon as the postage stamp is scanned, filter 6 passes a signal. At the same time filter 4 becomes blocked since the remission value of the postage stamp is less than 75%. The signal at the output filter 4 is evaluated by the integration link 5 during a time period corresponding to the movement of the envelope through a distance of 20 millimeters, and is then stored in register A. The remission value of the postage stamp is ascertained by the integration link 7 during a time period corresponding to the movement of the envelope for a distance of 10 millimeters, and is then stored in register B. During the period of time that the postage stamp is scanned, filter 8 becomes operative and thus primes the gate K. The modulation of the stamp is separated from its direct current component by the differentiation link 10. If this modulation signal is beyond a certain amplitude value it will be passed through gate K, now open, and through pulse converter 12 to the counter 13. Only if a predetermined minimum number of pulses has been attained, namely, the number equal to the minimum number of the brightness fluctuations occasioned by a postage stamp, will the counter 13 produce an output for transfer to the register E. Link 9, however, will not provide a signal to register D since the integration link 9 is blocked because the signal is not possessed of the necessary length of 40 millimeters. The registers A, B and E open the gate F. Gate M is likewise open since a signal from gate F has been applied to it. The signal hence reaches the gate O. If now either at the same time or thereafter the scanning pulse arrives, it will be passed on to the evaluation equipment W.

In the case of an envelope having a dark background with low brightness, the filter 4 remains blocked. Filter 8 becomes operative, and the integration link 9 permits transfer of the signal to the register D whenever the duration of the dark background being scanned exceeds a period of time corresponding to the movement of the envelope for a distance of 40 millimeters. With the postage stamp scanned at a scanning length of 10 millimeters and with a remission value less than 65%, the signal will pass through filter 6 and link 7 to reach the register B. The registers D and E open the gate L but gate F remains closed since the signal from register A is missing. Accordingly, gate M is opened too, so the path leading the signal to the evaluation equipment W is as just described.

If any of the pertinent conditions such as modulation, magnitude of the brightness amplitude, and number of the luminosity fluctuations be not fulfilled, then no signal can reach the equipment W. Such is the case also if the background of the paper comprises bright, as well as dark, areas. Under this condition no signal can reach the equipment W because the gates F and L remain closed. Also, it is insured that a duly stamped envelope will be recognized irrespective of whether its background brightness be either bright or dark.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. An arrangement for detecting the presence of a characteristic marking on an article comprising scanning means, means for conveying said articles past said scanning means at a predetermined speed, a plurality of filter means coupled in parallel to said scanning means, one of said filter means having a characteristic which permits the passage therethrough of signals having a predetermined amplitude and duration, a second one of said filter means having a characteristic which permits the passage therethrough of signals having a lesser amplitude and smaller duration than those which pass through said first filter means, a third one of said filter means having a characteristic which permits passage therethrough of signals having an average amplitude between said first and said second mentioned signal values and whose duration is less than the time duration of signals which pass through said first filter means, pulse counting means coupled to said third filter means, a plurality of gate circuits, one of said circuits coupled to the output of said first and second filter means and said counting means, the other of said gate circuits coupled to said third filter means and said counting means, and utilization means coupled to both said gate circuits, said utilization means operable upon scanning of said characteristic marking for a predetermined time.

2. An arrangement as claimed in claim 1, further comprising integrating means and register means coupled between said filter means and said gate circuits, respectively.

3. An arrangement as claimed in claim 1, further comprising an additional two input gate circuit, having one of its signals coupled between said third filter means and said pulse counter, differentiating means and a fourth filter means disposed intermediate said scanning means and the other input of said additional gate circuit.

4. An arrangement as claimed in claim 3, wherein said fourth filter means has a characteristic which permits the passage therethrough of signals having a predetermined minimum amplitude.

5. An arrangement as claimed in claim 3, wherein said differentiating means is coupled to the output of said scanning means.

6. An arrangement as claimed in claim 1, further comprising pulse converting means disposed between said third filter means and said pulse counting means, said converting means adapted to produce from the modulation of the signal produced by said scanning means, a plurality of pulses having uniform amplitude and duration.

7. An arrangement as claimed in claim 1, wherein the characteristic of said first filter means corresponds to the time required for said article to be conveyed by said conveying means a first predetermined distance, the characteristic of said second filter means corresponds to the time required for said article to be conveyed by said conveying means a second predetermined distance, said second distance being less than said first distance, and the characteristic of said third filter means corresponds to the time required for said article to be conveyed by said conveying means a distance greater than said first distance.

8. An arrangement as claimed in claim 1, further comprising a further gate circuit disposed intermediate said utilization means and said first mentioned gate circuits, said further gate circuit operable in response to a signal received from either of said first mentioned gate circuits.

References Cited in the file of this patent

UNITED STATES PATENTS

| | | |
|---|---|---|
| 1,729,521 | Roddy | Sept. 24, 1929 |
| 2,612,994 | Woodland et al. | Oct. 7, 1952 |
| 2,833,937 | Cox | May 6, 1958 |
| 2,894,626 | Mulders et al. | July 14, 1959 |